May 6, 1924.
E. W. NEWELL
1,493,050
INDICATING DEVICE FOR MOTOR VEHICLES
Filed Jan. 10, 1920    2 Sheets-Sheet 1
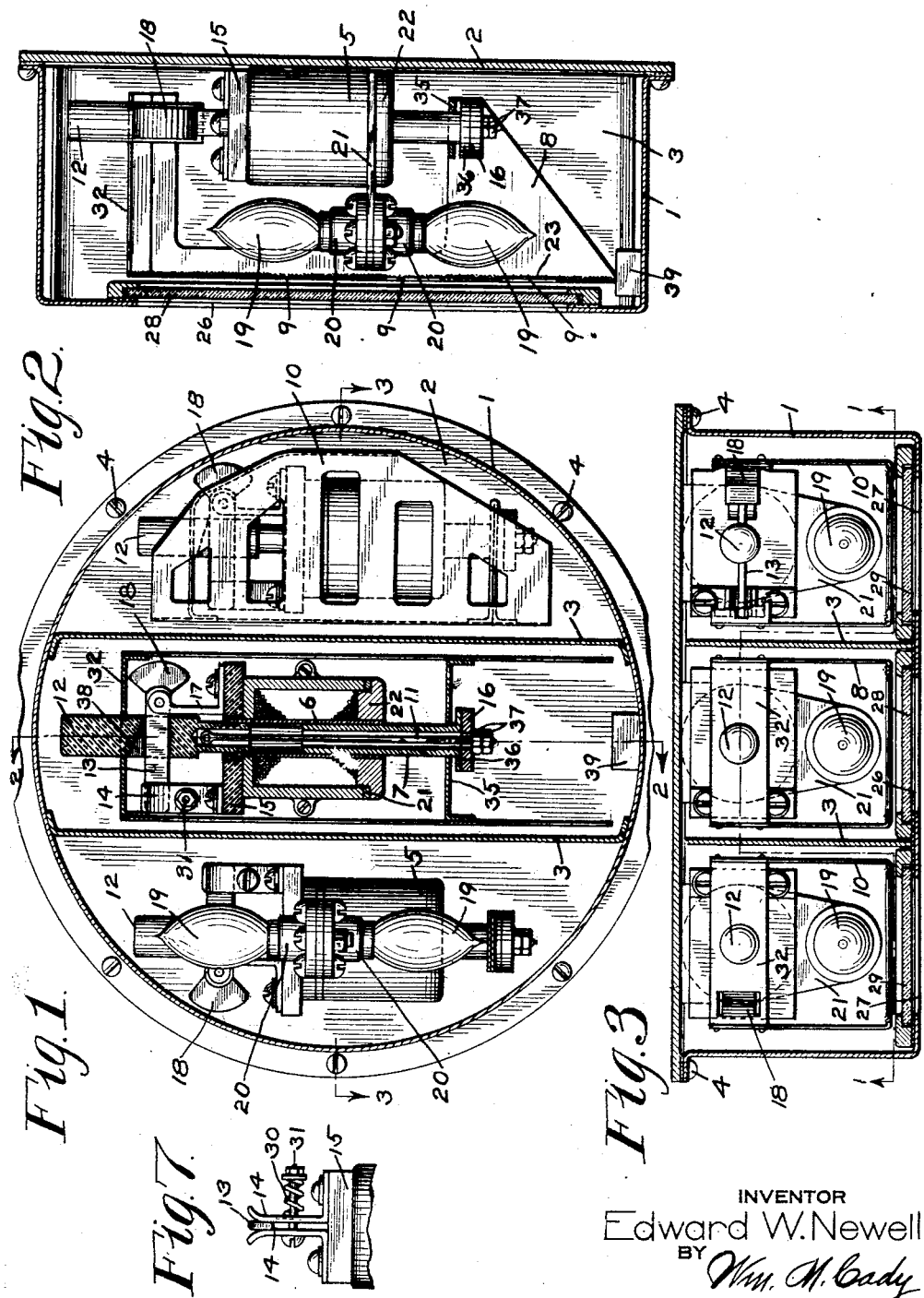
INVENTOR
Edward W. Newell
BY
Wm. M. Cady
ATTORNEY May 6, 1924.
E. W. NEWELL
1,493,050
INDICATING DEVICE FOR MOTOR VEHICLES
Filed Jan. 10, 1920   2 Sheets-Sheet 2
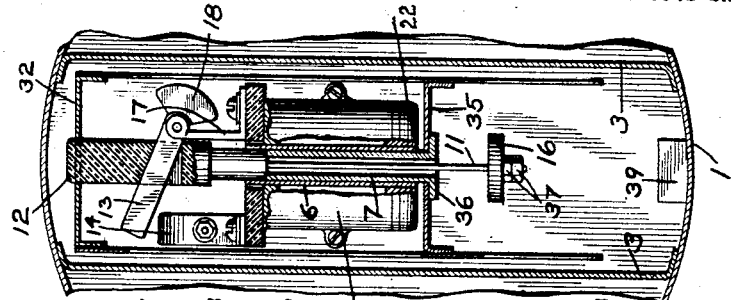
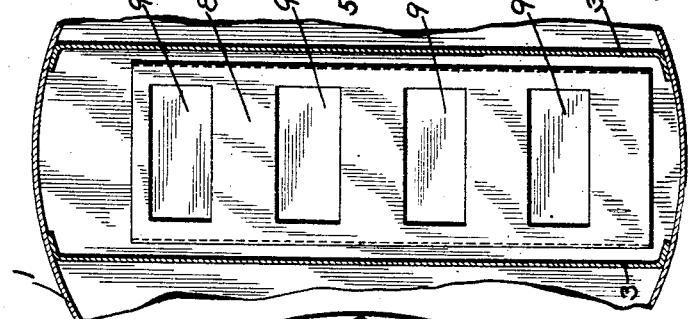
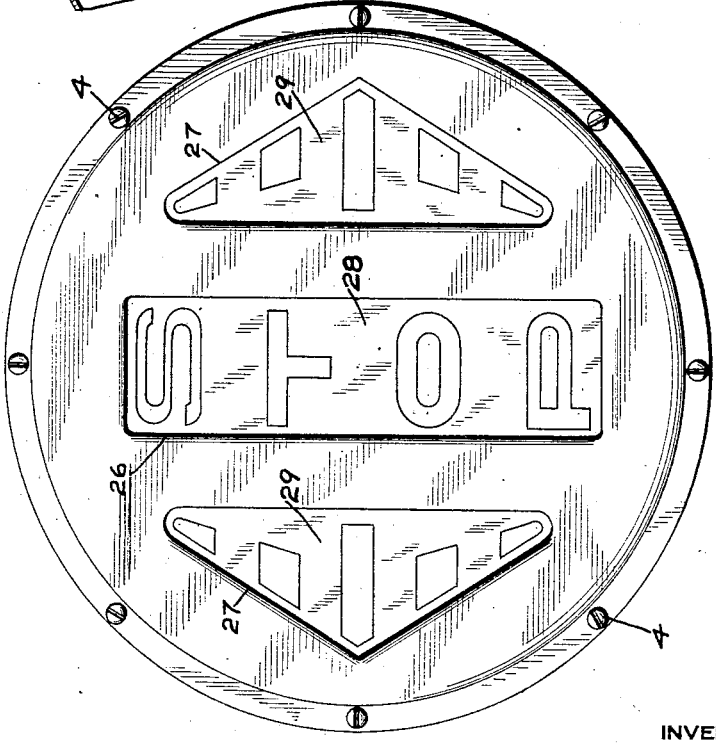
INVENTOR
Edward W. Newell
BY Wm. M. Cady
ATTORNEY Patented May 6, 1924.

1,493,050

UNITED STATES PATENT OFFICE.

EDWARD W. NEWELL, OF PITTSBURGH, PENNSYLVANIA.

INDICATING DEVICE FOR MOTOR VEHICLES.

Application filed January 10, 1920. Serial No. 350,691.

*To all whom it may concern:*

Be it known that I, EDWARD W. NEWELL, a citizen of the United States, residing at Pittsburgh, in the county of Allegheny and State of Pennsylvania, have invented new and useful Improvements in Indicating Devices for Motor Vehicles, of which the following is a specification.

This invention relates to signaling devices, and more particularly to a signaling device for motor propelled vehicles adapted to indicate when the vehicle is about to stop or the direction in which the vehicle is about to turn, either in the daytime or at night.

The principal object of my invention is to provide an improved vehicle signaling device of the above character.

In the accompanying drawings; Fig. 1 is a section of a signaling device embodying my invention on the line 1—1 of Fig. 3, with one of the solenoid operated shutters removed; Fig. 2 a partial section on the line 2—2 of Fig. 1, the solenoid unit not being sectional; Fig. 3 a section on the line 3—3 of Fig. 1; Fig. 4 a face view of the signal indicating device; Fig. 5 a fragmentary vertical section of the device, showing the middle shutter; Fig. 6 a view similar to Fig. 5, but showing the solenoid partly sectioned, and the shutter in its upper position; and Fig. 7 an end view of the contact device.

According to the preferred construction of my device, a cylindrical pressed steel casing 1 is provided, which is adapted to be secured by bolts 4 to a base plate 2.

The interior of the casing 1 is divided into three compartments by partitions 3 which are secured to the casing 1, and the solenoid operated units for operating the shutters are secured to the base plate 2, so that a solenoid unit will be positioned in each compartment when the casing is applied in position. By this arrangement, the removal of the casing exposes the internal parts to view and facilitates their inspection and adjustment.

The solenoid units may be of like construction, so that a description of one applies to all.

Each unit may comprise a solenoid coil 5 having a central brass bushing 6 within which a soft iron core member 7 is adapted to reciprocate. Each core member 7 is adapted to operate a shutter, the central core member a shutter 8, having rectangular openings 9, as indicated in Fig. 5, and each of the other core members, a shutter 10 having openings, one of which shutters is shown at the right in Fig. 1.

Each shutter is provided with a cross piece 35 adapted to be loosely supported by a flange 36 provided at the lower end of the core member 7, the cross piece having an opening through which the core member extends.

Extending through the hollow core member 7 is a bolt 11, to the upper end of which is attached a section of insulating material 12, having a portion extending into the bushing 6 and adapted to reciprocate therein.

Supported by nuts 37 on the lower end of the bolt 11 is a washer 16 which is adapted to be engaged by the flange 36 upon a predetermined downward movement of the core member 7.

A knife contact 13 extends through a slot 38 in the section 12 and is adapted to engage between a pair of fixed contact members 14, which are mounted on and secured to a block 15 of insulating material, applied to the top face of the magnet 5.

The contact 13 is pivotally mounted on a bracket 17, secured to the block 15, and is provided with a counter-weight portion 18, tending to hold the contact 13 out of engagement with the contacts 14.

To provide resiliency in the contacts 14, a spring 30 may be employed, which is held in position by means of a bolt 31, passing through the contacts 14.

In order to provide illumination at night, electric lamps 19 are employed preferably two for each unit, said lamps being mounted in lamp sockets 20, fastened to opposite sides of a plate 21, which is secured in position between the lower end of the solenoid 5 and the cap member 22.

The shutters may be guided at the top by a cross piece 32 secured to each shutter and adapted to slide on the extended portion of the fibre section 12.

The openings in the shutters 8 and 10 are backed with a piece of translucent material 23, secured to the shutter, preferably a red fabric, although the openings may, if desired, be backed with plain glass.

The face of the casing 1 is provided with a central rectangular opening 26 and triangular openings 27 and back of these openings are secured sections of plain glass 28 and 29, the central one having outlined on the back the letters S-T-O-P and the other sections, the stencil outline of an arrow head, the remaining surface of the glass sections being coated with an opaque paint, or said surface may have applied thereto an opaque paper or other fabric with the letters cut out of same. The outer faces of the shutters 8 and 10 are painted white.

The solenoids 5 are operated by electric current, preferably derived from the storage batteries on the vehicle which are employed for the lighting and engine starting systems and the control may be by a suitable switch mechanism, such, for example, as that shown in my prior Patent No. 1,318,792, dated October 14, 1919.

Normally, the solenoids 5 are deenergized and the shutters 8 and 10 are maintained in their lower positions by gravity, in which positions, the openings in the shutters register with the clear spaces on the sections of glass 28 and 29 which cover the openings 26 and 27 in the casing.

When it is desired to indicate in the daytime that the vehicle is about to stop, the operator closes a switch controlling the circuit of the middle solenoid 5. This solenoid being thus energized, the core member 7 thereof is moved upwardly, so that the shutter 8 is operated to bring the white painted surface thereof into registry with the clear openings in the casing.

In the upward movement of the core member 7, as it nears the end of its stroke, it engages the lower end of the section 12, so that further upward movement lifts the section 12 and thereby causes the movement of the contact 13, so that the circuit of the solenoid 5, which is completed through the contacts 14 and 13, is opened, as shown in Fig. 6 of the drawings. The gravity action of the counter-weight 18 on the contact 13 assists the opening movement of the contact and tends to ensure the positive action of the switch and at the same time dispenses with the use of springs.

As soon as the circuit is opened the solenoid 5 becomes deenergized and the weight of the shutter 8 and the core 7 cause the parts to move downwardly by gravity, so as to bring the openings in the shutter into registry with the clear openings in the casing glass.

As the core member 7 nears the end of its downward stroke, it engages the plate 16 so that further movement shifts the bolt 11 downwardly and with it the section 12, causing the contact 13 to be moved into engagement with the contacts 14.

The switch contacts being connected in series with the solenoid 5, the circuit of the solenoid 5 is then completed, so that the solenoid is again energized to repeat the operation as above described.

It will now be seen that closing the switch controlling the solenoid 5, causes the intermittent movement of the core member 7 and the shutter 8, by the automatic energization and deenergization of the solenoid, through the making and breaking of the circuit at the contacts 13 and 14, and as a consequence, the white painted surface of the shutter is intermittently flashed into and out of view so as to attract the attention of any one observing the vehicle, to the fact that the vehicle is about to stop.

In a similar manner, if the vehicle is to be turned to the left or to the right, a switch is closed by the operator so as to energize either the left or the right hand solenoid 5 and thereby intermittently flash the white surface of the corresponding shutter so as to attract attention to the arrow head indicating the direction in which the vehicle is about to turn.

For signaling at night, as in my prior patent hereinbefore referred to, the controlling switch is turned to a position in which the electric lamps 19 are connected in circuit as well, as the solenoid, when it is desired to signal.

At night, the operation will be otherwise substantially the same as in the daytime, except that as the shutter moves intermittently, the light from the electric bulbs will pass through the red colored fabric covering the openings in the shutters, so that the signal is intermittently flashed in red light at night.

A block 39 of soft rubber may be mounted in the casing 1, so as to be engaged by the shutter 8 in its downward movement and thus serve as a cushion stop therefor, as shown more clearly in Fig. 2 of the drawings.

As hereinbefore described, the openings in the shutters 8 and 10 are backed by a red colored fabric and in the day time, the red fabric will be visible through the openings in the outer casing, to a certain extent, when the parts are in normal position, especially if there is a contrast set up, due to the backing of the glass plates 28 and 29 which may be black or grey or some other color other than red.

In order to render these openings as invisible as possible, the red fabric may be faced by a thin fabric of the same color as the backing on the glass plates.

I have found, by experiment, that fabrics having a more or less coarse mesh will conceal the red fabric underneath, so far as reflected light in the day time is concerned, while it permits the passage of the red rays of light therethrough, when signaling at night.

Having now described my invention, what I claim as new, and desire to secure by Letters Patent, is:—

1. In a motor device, the combination with a solenoid having a movable core, of a member movable by gravity in one direction and by said core in the opposite direction upon a movement of the core relative to said member, a movable contact for controlling the solenoid circuit and movable to close the solenoid circuit by the gravitational movement of said member and to open the circuit by the movement of the core in the opposite direction, and a slide movable by gravity in one direction and by said core in the opposite direction.

2. In a motor device, the combination with a solenoid having a movable core, of a member movable by gravity in one direction and by said core in the opposite direction upon a movement of the core relative to said member, and a movable contact having a gravity bias tending to move said contact to open position for controlling the solenoid circuit and movable to close the circuit by the gravitational movement of said member in one direction and to open the circuit by the movement of said member in the opposite direction.

3. In a motor device, the combination with a solenoid having a movable core, of a member having a slot and movable by gravity in one direction and by said core in the opposite direction and a pivotally mounted contact extending through the slot in said member and movable to close the solenoid circuit by the gravitational movement of said member and to open the circuit by the movement of said member in the opposite direction.

4. In a motor device, the combination with a solenoid having a core movable by gravity in one direction and provided with a flange, of a member movable by gravity in one direction, means carried by said member for engaging said flange, a contact operable by said member for controlling the solenoid circuit, and a slide adapted to be engaged by said flange upon movement of the core in one direction.

5. In a motor device, the combination with a solenoid having a core movable by gravity in one direction and provided with a flange, of a member movable by gravity in one direction, means carried by said member for engaging said flange, a contact operable by said member for controlling the solenoid circuit, and a slide adapted to be engaged by said flange upon movement of the core in one direction and movable by gravity in the opposite direction.

In testimony whereof I have hereunto set my hand.

EDWARD W. NEWELL.